Patented Oct. 19, 1954

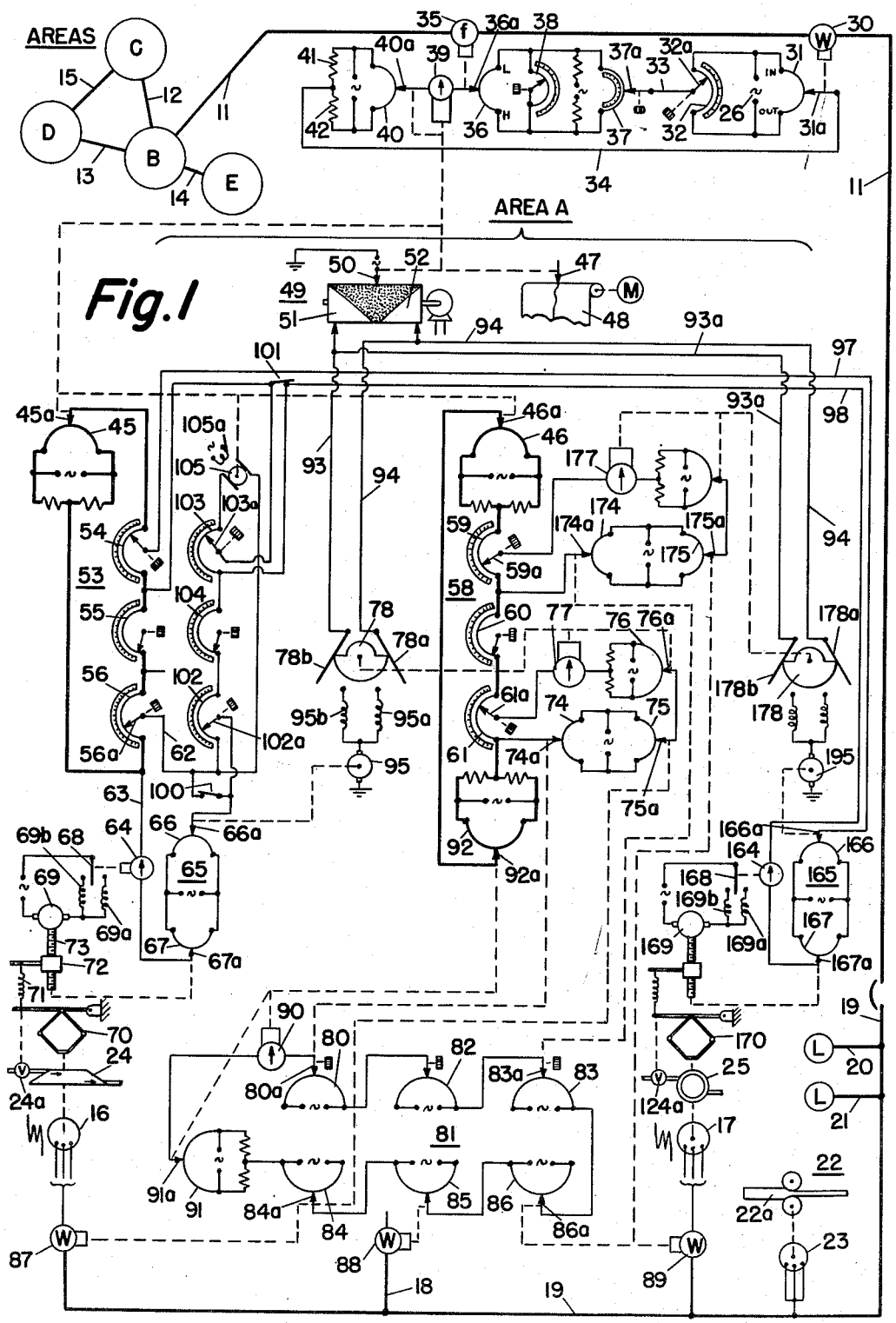

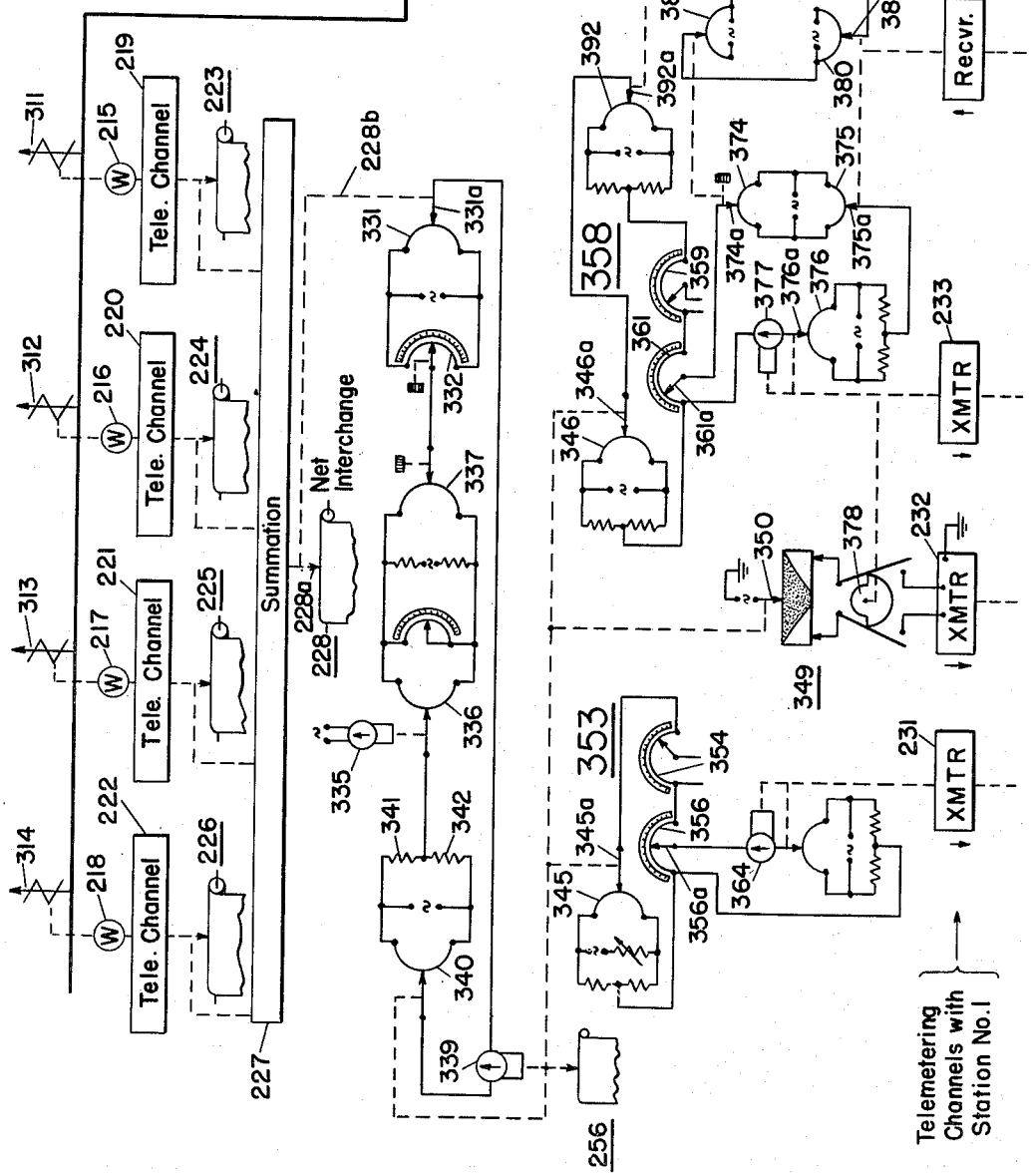

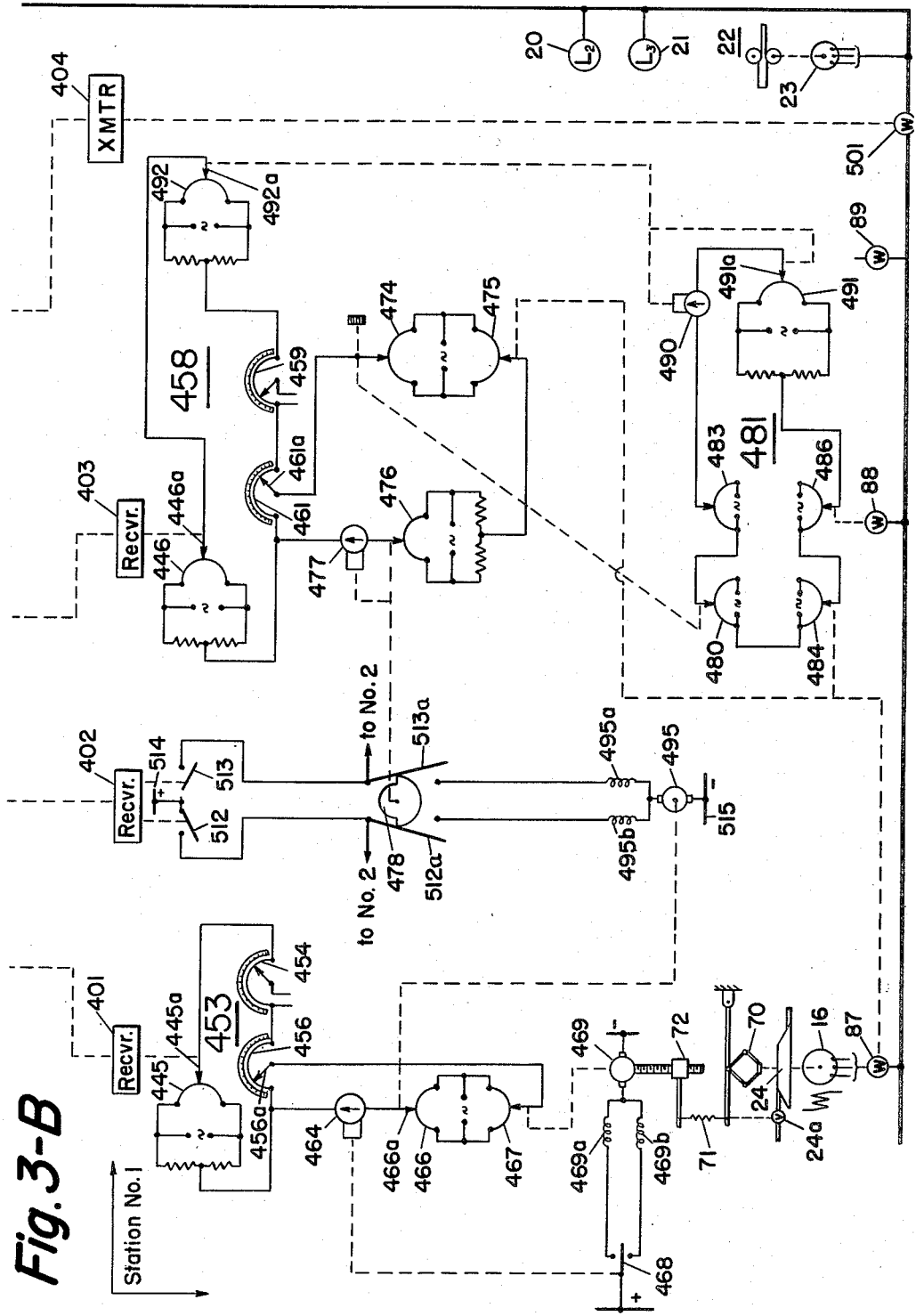

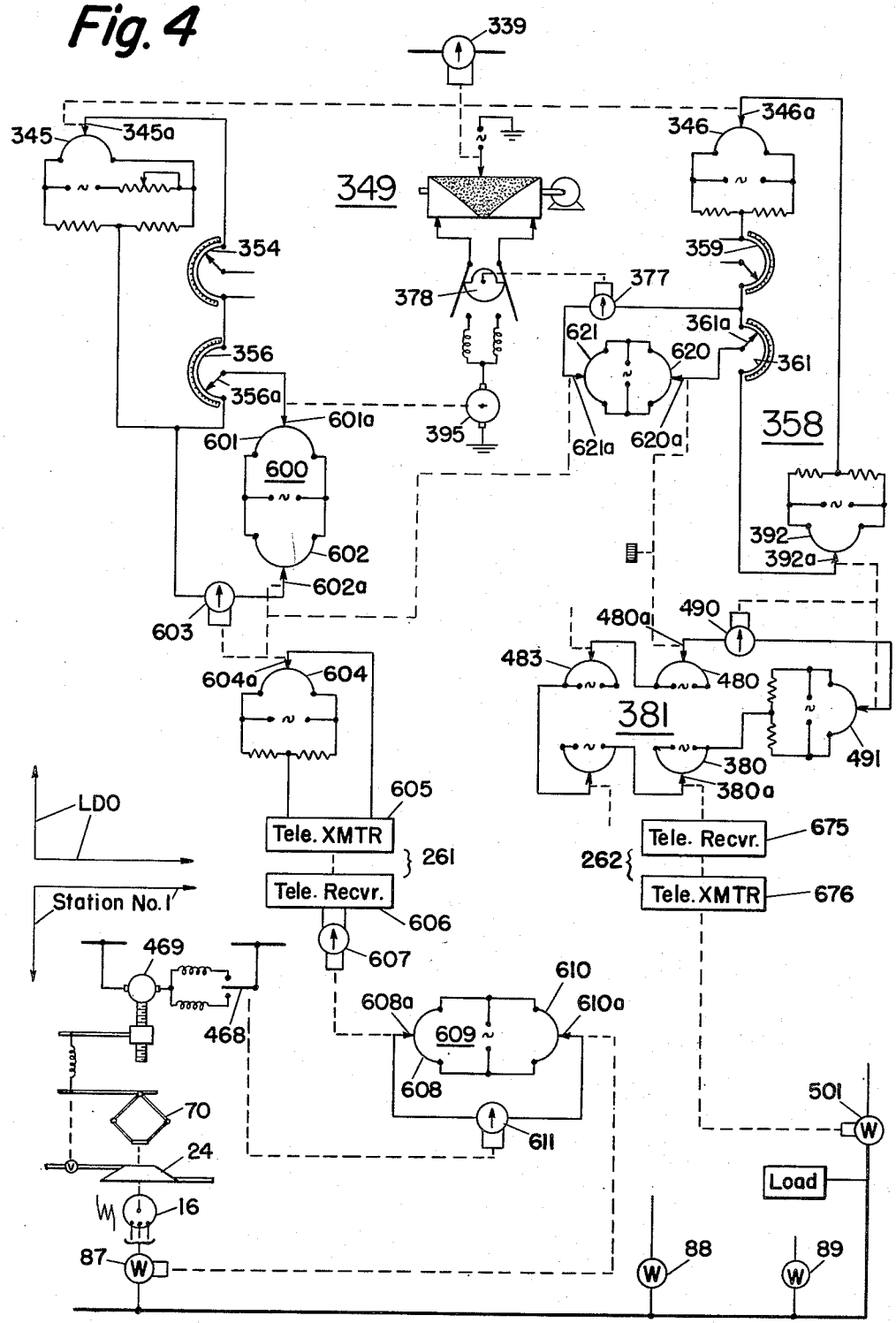

2,692,342

UNITED STATES PATENT OFFICE 2,692,342

APPARATUS AND METHOD FOR CONTROL OF ELECTRICAL GENERATION

Clark Nichols, Oreland, and James B. Carolus, Elkins Park, Pa., assignors to Leeds and Northrup Company, Philadelphia, Pa., a corporation of Pennsylvania Application June 4, 1953, Serial No. 359,514

28 Claims. (Cl. 290—4)

This invention relates to control of the generation of power in the component areas, stations and units of a distribution network and has for an object the provision of systems of and methods for introducing different types of control actions related in magnitude to produce the most efficient or economical operation of each area while simultaneously maintaining scheduled commitments with all adjacent areas.

As well understood by those skilled in the art, the trend over a period of years has been the interconnection to a network not only of a plurality of generating units, but also the interconnection of a plurality of areas each including a plurality of generating sources. There will not only be a steady load upon the distribution network but, in general, there will also be fluctuating loads of a cyclic nature which must be supplied by power generation sources. Each power generation source, as one or more generators, has a governor which responds to change in speed or change in frequency and has been utilized to introduce a corrective control action. Where an area or a particular distribution system is not connected with other areas, control systems operating upon changes of frequency have been utilized and have been relatively satisfactory. Even when two areas are interconnected by a tieline, system frequency may again be relatively satisfactory for control purposes, if the two areas are of substantially the same size as regards power generation or load. In this connection, if the two areas each supplies its own base load of, say, 1,000 megawatts, a change on one area of, say, 10 megawatts will, as by a change in system frequency, produce a control signal which will cause each area to divide the 10 megawatts. Since the load was assumed to arise only on one area, an additional control action must be introduced if the generating capacity of that area is to supply its own load. Such a control action has been utilized and may be referred to as reset action.

It is to be assumed that an operating area has sufficient generating capacity or regulating range to meet changes in customer load within the boundaries of that area. Even so, the interchange of power over a tieline resulting from the sudden application of load to one area is divided as between the several areas.

As interconnection of areas has been extended, many cases have arisen in which one area may have a base load many times that of another. For example, an area having a base load of 1,000 megawatts may have a tieline connection to another area having a base load as high as 19,000 megawatts. In such a case, the addition of the 10-megawatt load to the area of lower base load would normally produce an immediate change in generation therein of but half a megawatt, whereas the area having a base load of 19,000 megawatts would supply 9.5 megawatts, which must flow over the tieline from the larger to the smaller area. This immediate change in generation on each area is caused primarily by the governor action associated with the resulting change in system frequency. Under such circumstances, reset action would then be necessary in the first area to raise the generating capacity therein by the 9.5 megawatts temporarily taken by the larger area. If the 10-megawatt change in customer load is sustained for an appreciable length of time, correction by sustained or reset action at a relatively slow rate is satisfactory provided that the 9.5-megawatt load fluctuation on the tieline does not exceed its capability. Increasing the rate of correction with sustained or reset action would tend to be effective in reducing the 9.5-megawatt load deviation on the tieline for a single sustained change in customer load. However, if this 10-megawatt load change is of a fluctuating or fringe nature, increasing the rate of reset correction will magnify the tieline load fluctuations so that they exceed 9.5 megawatts. This occurs for the reason that the reset action is out of phase with the customer load change. Consequently, a control action must be introduced which is more nearly in phase with the customer load change and this is commonly referred to as fringe or proportional action. As will be shown in detail later, it is highly desirable that these control actions be separately and independently adjustable in order to utilize the best regulating characteristics of the generating sources. One of the prime objectives of this invention is the provision of a system providing the foregoing independently adjustable control actions, as well as to provide for other desirable time-function control actions separately and independently adjustable.

In accordance with the present invention, areas of widely differing base load and of generating capacity may be interconnected with a minimum of undesirable flow of power between them by provision of circuit components for segregation and independent control of the proportional and reset actions. More particularly, a system condition varying with changes in load, whether of uniform or fluctuating character, is subdivided by the components of control means, and the several independently adjustable control signals are then utilized relatively to adjust the extent of the proportional and time-function changes to be made within the area. The time-function change may include reset action, the time integral of the deviation, or it may include the rate of change of the deviation, and in some cases the time-function may desirably include both.

Further in accordance with the invention, there is provided an interdependence in the operation of the reset and proportional actions in that when the proportional action for a station or a generating unit exceeds the amount of reset action, the reset action will be blocked until the proportional action has been reduced to a value below that of the assigned reset action.

Where rate action is also included, it too is effective to block reset action where the rate action exceeds the magnitude of the assigned reset action. The rate action in blocking reset action may be additive to the proportional action so that reset action can take place only when the sum of the two is decreased below the assigned magnitude of the reset action.

For brevity in the description and the claims, the term "generating source" is used herein generically to mean a generating area, a generating station, or a generating unit.

For further objects and advantages of the invention, reference is to be had to the following description taken in conjunction with the accompanying drawings, in which:

Fig. 1 diagrammatically illustrates one form of the invention as applied to one of the several interconnected areas and illustrates the operation of the invention as applied to a multiplicity of units at one station;

Fig. 2 is a block diagram illustrating the relationship of Figs. 3A and 3B;

Figs. 3A and 3B jointly and diagrammatically illustrate the invention as applied to a multiplicity of stations, each having a plurality of units and including the apparatus located at the load dispatcher's office, together with certain of the telemetering channels; and Fig. 4 diagrammatically illustrates how the invention may be utilized with a minimum number of telemetering channels.

Referring to Fig. 1, the invention in one form has been shown as applied to a distribution network comprising interconnected areas A-E. More particularly, area A is connected to area B by way of a tieline 11; area B being connected with areas C, D, and E by tielines 12, 13 and 14; areas C and D also being interconnected by tieline 15. Geographically, the several areas may be widespread and separated by great distances.

In a particular area, such for example as area A, there may be included a plurality of generating units, such as a steam-driven generator 16 and a hydraulically driven generator 17. Area A may also include a third generator (not shown) connected by line 18 to a common bus line 19. In Fig. 1 the area A has been illustrated in its simplest form and as including but a single station having the several generating units, whereas in practice, an area may include a multiplicity of stations as will be later explained. As shown, the area A has customer loads generally indicated at 20 and 21 which may be considered of fairly constant value, that is to say, any changes in loading take place over a matter of minutes rather than seconds. As exemplary of fluctuating loads, such as traction systems, arc furnaces, and the like, is a rolling mill 22 driven by a motor 23 connected to the bus 19. The load change will be from a negligible value to full load as a billet 22a enters the reducing rolls.

In order that the customer load may be supplied at all times and yet to preserve the most economical operation of the station as a whole, account must be taken as to the capabilities of the power generating equipment. Accordingly, the steam driven generator 16, driven as by a steam turbine 24, may be utilized to carry the base load and with but a fraction of the fluctuating load as compared with the hydraulically driven generator 17, driven as by a waterwheel 25. The foregoing differences as between the two generating units 16 and 17 are to be taken as exemplary only, since with steam units now available a substantial part of a fluctuating load may be taken care of by them, though, in general, and for economic reasons, it is desirable to maintain the average load on a steam generating unit constant over a period of time, as of the order of minutes instead of seconds.

Aside from the characteristics of the hydro-unit which may lend itself to the fluctuating load, it may frequently be desirable that it only be utilized for the fluctuating load because of availability of the water supply. Thus, when the water supply is limited, changes in the base load will be assumed by the steam driving units. The foregoing demonstrates the need for the establishment of an economic load schedule which not only takes into account the capacities of the several generating units and the available driving power, but also the economies involved in their operation to meet changing customer load on the system. In order that a desirable economic loading schedule be followed, it is necessary that the control actions applied to the several generating units correspond with their characteristics both as regards permissible rates of change of power output and economy of operation.

For fluctuating loads there is required a fringe type of control, that is to say, a change in power output commensurate in magnitude with that of the fluctuating load. Such fringe control, or proportional action, will ordinarily be widely different as between the steam driven generator 16 and the hydro-unit 17. Similarly, gradual changes in base load will require changed levels of power generation attained by reset control action. However, the magnitudes of the reset control actions will differ as between the several units. Where conditions at the station change, as for example, alleviation of the water shortage and availability of more steam generating capacity, the relative degrees of proportional and reset actions will change for most economic operation of the station as a whole.

As will be later explained, time-function control actions other than reset may be included, such for example, as a desired degree of rate action to adjust generation output in accordance with rate of change of customer load on the area.

The initiating signal for the control system may be obtained by any of a number of well known devices and may be determined in accordance with the nature of the operation desired of area A. For example, if the area is to be maintained on a flat tieline load schedule, meaning that there will be purchased or sold a certain amount of power regardless of variables, such as system frequency or system time-error, the signal-producing means can be of relatively simple character. However, the more usual case is one which takes into account the foregoing variables and, accordingly, the signal-producing means disclosed and claimed in patent application Serial No. 228,036, filed May 24, 1951, by James B. Carolus, is preferred, and one form of such arrangement has been illustrated in the drawings.

More particularly, a device responsive to the load in tieline 11, such as a wattmeter 30, relatively adjusts a contact 31a relative to its associated slidewire 31. In the following description reference will be made to the adjustment of the contact of the slidewire, though in practice it is more usual to adjust the slidewire relative to a stationary contact. The slidewire 31 is energized from a suitable source of supply. For simplicity, each of the several slidewires has been illustrated as energized from an alternating-current source of supply 26 as indicated by the symbol therefor, though in practice it will be understood that transformers energized from a common source may be utilized or that direct-current sources may be employed. Associated with slidewire 31 is a second slidewire 32 having a manually adjustable contact 32a. With contact 31a midway of its slidewire 31 and with contact 32a midway of its slidewire 32, there will not be produced an output voltage between conductors 33 and 34. With zero load on tieline 11 the wattmeter 30 positions contact 31a at said mid-position. If there be a load-producing flow of power in one direction or the other, the contact 31a is adjusted above or below the mid-position depending upon said direction of flow. Thus, if there is a flow from area B to area A, the contact 31a may be moved upwardly, the upper end being labeled "In," suggesting the flow of power into area A. The lower end of the slidewire has been labeled "Out," indicating that when contact 31a is moved downwardly, area A is supplying power to the network including area B. To predetermine a schedule for area A it is only necessary to adjust contact 32a upwardly an amount corresponding with the amount of power to be supplied area A. The opposite adjustment from center will predetermine the amount of power to be supplied by area A to the network including area B. The scale of slidewire 32 is suitably calibrated as in megawatts.

Variation in flow of power over tieline 11 is but one of the variables taken into account to produce the initiating control signal. Another which is of importance is the deviation of the frequency with change of load. Such deviation of frequency occurs throughout the interconnected network. The frequency at tieline 11 is determined by a frequency meter 35 utilized to adjust a contact 36a relative to its slidewire 36 which is connected in a network including a slidewire 37 and associated contact 37a. The latter is directly connected to contact 32a. To maintain a frequency of 60 cycles, contact 37a is manually set to the mid-position of slidewire 37 and its associated scale. Deviation in frequency on tieline 11 from 60 cycles results in a movement of contact 36a from its mid-position. When the frequency is low it moves upwardly, and when the frequency is high it moves downwardly, the effective respective ends of the slidewire being labeled "L" and "H." The magnitude of the signal developed between contact 36a and contact 37a for equal displacements of contact 36a may be adjusted by a bias rheostat 38 having an associated scale which may be calibrated to show the changes in power with changes in frequency. Suitable resistors are included in connections of the foregoing network and its source of supply.

A detector 39 connected between contact 36a and a contact 40a of a slidewire 40 is responsive to the algebraic sum of the unbalance signals from the two subsidiary networks which have just been described. Slidewire 40 is included in the network including resistors 41 and 42, one end of the conductor 34 being connected between them. These resistors will normally be of equal magnitude so that when there is zero output from the subsidiary networks, contact 40a is positioned midway of the respective ends of slidewire 40. The detector 39 may be of any suitable type, such for example, as the electromechanical relay of Squibb Patent No. 1,935,732, but it is preferably a high-speed device, such as are the instruments available on the market under the trade-name of "Speedomax" and in some forms disclosed in Williams Patents Nos. 2,113,164 and 2,367,746. The symbol for such detector and the style used for the subsidiary networks thus far described will be used for the remaining detectors and subsidiary networks to be described without repeating the detailed description thus far presented.

If additional variables are to be taken into account in producing the initiating control signal, it is to be understood that they may be introduced by additional subsidiary networks with detector 39 responding to the algebraic sum of the deviations of all of the variables, or circuit changes may be made in the illustrated network, thus to bring in such variables as time-errors due to deviation of system frequency from the predetermined standard of 60 cycles, and the integral of tieline load deviations from scheduled load.

Accordingly, with detector 39 responding both to changes in tieline load and to deviation from the standard frequency, not only will contact 40a be adjusted by that detector to restore balance to the interconnected subsidiary networks, but the detector 39 will (1) relatively adjust a contact 45a relative to its slidewire 45; (2) relatively adjust a contact 46a relative to its slidewire 46; (3) position a pen-index 47 relative to a chart 48; and (4) actuate an impulse-producing device 49 by moving an adjustable contact 50 movable to the right or left from a mid-position relative to a cylinder having conducting segments 51 and 52 separated by insulating material shown by the shaded area. The impulse-producing device 49 preferably is of the type disclosed in copending application Serial No. 253,533, filed October 27, 1951, by James B. Carolus. Before describing the manner in which the impulses are produced by the device 49, brief consideration will be given to the production of the initiating control signal and to the effect of the adjustments of slidewire contacts 45a and 46a.

It will be remembered that the two subsidiary networks which produce the initiating control signal applied to detector 39 are preset as by contact 32a relative to slidewire 32 to predetermine the flow of power by way of tieline 11 and by means of the bias rheostat 38 to predetermine the change in power of tieline 11 with a predetermined change in frequency thereof. When there is departure from that predetermined schedule, the power level in the schedule being a system condition of a predetermined value, the detector 39 relatively positions contacts 45a and 46a of their respective slidewires in direction and by amounts related to the direction and extent of the deviation of the system condition from its predetermined value. The manner in which the initiating control signal is utilized to produce control actions which take into account the different characteristics of the generating sources will now be set forth in greater detail. Adjustment of contact 45a from its mid-position develops in a first control circuit or proportional-participation network 53, in which slidewire 45 is connected, a voltage of magnitude and sense related to the magnitude and sense of the initiating control signal. The area requirement or initiating signal as introduced into proportional network 53 is subdivided by participation setters, there being one in the form of a slidewire for each generating unit, as for example, participation setters 54 and 55 and 56, each with associated adjustable contacts and scales preferably calibrated from 0 to 100.

Similarly, adjustment of contact 46a from its mid-position develops in a network 58 a voltage of magnitude related to that of the initiating or area requirement signal and which is subdivided between sustained or reset participation setters 59, 60 and 61 also having manually adjustable contacts and associated scales preferably calibrated from 0 to 100.

The fractional part of the area requirement signal developed by the proportional participation setter 56 for the steam driven generator 16 is determined by the setting of contact 56a and, as shown, may be, say, 20% of the magnitude of the total proportional action desired. Such a fractional part of the signal is applied as by conductor 62, switch 100 and conductor 63 to a detector 64 and to a subsidiary network 65 by way of slidewires 66 and 67 with associated contacts 66a and 67a. With the latter contacts 66a and 67a midway of their slidewires, the network 65 is in balance, and thus the appearance of a signal between conductors 62 and 63 immediately produces operation of detector 64 to move a motor-controlling switch 68 to complete an energization circuit for a motor 69 for rotation in a direction to adjust a governor 70 of turbine 24 to change the generation of the generator 16 in direction and by an amount related to the fraction of the area requirement signal developed by participation setter 56. Thus, as soon as the area requirement signal appears, an adjustment of the governor 70 takes place, the actuation thereof being through a spring 71 whose tension is adjusted by movement of a threaded nut 72 along a threaded shaft 73 driven by motor 69. As the adjustment of the governor 70 is changed, contact 67a is moved by motor 69 to balance the signal applied across conductors 62 and 63 by setter 56.

It will be understood that as the change in generation by generator 16 appears at tieline 11, the area requirement signal will be decreased. When that signal has been reduced to zero, the parts are returned to their illustrated positions. However, the actual operation is not that simple, and thus there must be provided additional control actions, one of which includes the adjustment of contact 46a in response to the area requirement signal.

The signal applied to network 58 as a result of adjustment of contact 46a relative to its slidwire 46 is subdivided for sustained or reset control action of the generator 16 by the setting of contact 61a. As shown, it has a position at approximately 70%, which indicates that steam driven generator 16 is to assume a substantial proportion of a sustained load change. Slidewire 61 is connected in a subsidiary network which includes a base setter in the form of a slidewire 74, a slidewire 75 whose contact 75a is adjustable in accordance with actual generation of unit 16 and a rebalancing slidewire 76. A detector 77 responds to the algebraic sum of the signals developed by slidewires 61, 74 and 75 and adjusts contact 76a to rebalance the subsidiary network and to operate the actuator 78 of a double-pole switch, such actuator being shown in the form of a cam.

In the subsidiary network, it will be observed that slidewire contact 74a is mechanically connected to a contact 80a of a slidewire 80 included in a computing network 81, both of contacts 74a and 80a being manually adjustable as indicated by the knob. The computing network 81 also includes additional base-setting slidewires 82 and 83 with associated contacts, each of them representing a unit base-setter and each being mechanically connected to corresponding slidewires in additional subsidiary networks respectively associated with reset participation slidewires 59 and 60 of network 58.

The subsidiary network and connections associated with slidewire 60 have been omitted for the sake of simplicity. However, there has been illustrated the mechanical connection from slidewire contact 83a to contact 174a of the slidewire 174, as well as the subsidiary network associated with slidewire 59 of network 58.

In the computing network 81 there are also included slidewires 84, 85 and 86, their associated contacts being adjustable in accordance with the actual generation of the respective generating units, such adjustments being made as by wattmeters 87, 88 and 89 respectively connected in circuit with each of the lines from the respective generators. Thus, the wattmeter 87 not only adjusts slidewire contact 84a, but also through the mechanical connection indicated adjusts contact 75a of slidewire 75. Similarly, wattmeter 89 adjusts contact 175a of slidewire 175 in the network associated with slidewire 59.

The algebraic sum of the signals introduced by the computing network 81 is detected by a detector 90 which adjusts contact 91a of a rebalancing slidewire 91 and also relatively adjusts a contact 92a of a slidewire 92 included in the network 58.

With the parts in the positions illustrated, it may be assumed that each of the generating units is supplying its share of the load in accordance with the respective adjustments of the base setters 80, 82 and 83 and associated setters only two of which, the setters 74 and 174 being shown. Upon appearance of an area requirement signal, however, the proportional action already described is initiated. At the same time the contact 50 of the impulse-producing device 49 has been moved from its mid-position. For convenience of explanation, it will be assumed that the area requirement signal has in part resulted from a deviation from schedule as by power flow from area B by way of tieline 11 into area A. This means that area A should increase its generation to return to schedule. Accordingly, contact 50 will be moved to the right to produce "raise" signals by reason of its periodic engagement with conductive segment 52, the length of the signals being related to the magnitude of the area requirement signal. These "raise" signals are applied to conductor 94 but are not effective unless switch actuator 78 has been operated to close contact 78a for energization of motor 95 and its field winding 95a.

If proportional action be neglected for the moment, then the appearance in the subsidiary network including detector 77 of its fractional part of the area requirement signal will produce operation of switch actuator 78 to close contact 78a. Accordingly, the "raise" impulses will then flow through winding 95a and motor 95 to energize it for rotation in a direction to move contact 66a of network 65 to the right. The sustaining corrective action will be in the same direction as the proportional action and will cause detector 64 to energize motor 69 by way of its winding 69a to change the setting of governor 70 for an opening movement of turbine control valve 24a to increase the generation by unit 16. As long as the circuit is closed by way of switch contact 78a, the pulses of variable length will continue to flow to motor 95 and thus bring into operation the time-integral corrective action.

The network 58 and the associated subsidiary networks in part form the subject matter of copending application Serial No. 344,838, filed March 26, 1953, by Nathan Cohn, a co-employee of ours.

As the unit 16 increases its generation, the wattmeter 87 adjusts contacts 84a and 75a in their respective networks. The effect of adjustment of contact 75a is to restore balance to the subsidiary network including detector 77. The effect of the adjustment of contacts 84a is to unbalance computing network 81 whose detector 90 responds by restoring balance with adjustment of contact 91a and at the same time to adjust contact 92a relative to slidewire 92. The effect of the latter adjustment, which occurs as slidewire contact 46a returns toward the illustrated position, is to maintain in network 58 a potential difference, as applied to the reset participation setters, of the same value as produced by the original adjustment of slidewire contact 46a of that network. Thus, the adjustment of slidewire contact 92a does not affect the magnitude of the signals developed by the participation setters. As slidewire contact 92a is moved so is contact 46a, but in the opposite sense, by reason of the fact that the changed generation by unit 16 as detected by wattmeter 30 and by frequency meter 35 reduces the area requirement signal.

The reset action takes place during the time the contact 78a is maintained in its closed position and is terminated when the algebraic sum of the voltages applied to detector 77 reaches zero. This occurs when detector 77 returns contact 76a to its mid-position. It returns that contact to its mid-position when as a result of increased generation, contact 75a is moved to introduce into the network a compensating signal or potential difference equalling that introduced by the participation setter 61. It is in this manner that unit 16 takes up its predetermined share of the sustained load change.

Now that there has been described an example of the operations resulting from the occurrence of an initiating, or area requirement, signal and the manner in which such a control signal is divided between proportional participation setters and reset or sustained participation setters, it will be understood that if a control signal of opposite sense appears the adjustment of governor 70 will be in an opposite direction to that previously described. Nevertheless, there will be present the predetermined proportional control action and the predetermined reset control action for unit 16. In both the illustrated case and in the one under discussion the proportional and reset control actions for the other units of the station comprising area A will be different as determined by the independently and separately adjustable participation setters of networks 53 and 58.

The control of the generation of unit 17 by the system differs materially over than described for unit 16 solely by reason of the changes in the percentage settings of the respective participation slidewires 54 and 59. More particularly, it will be seen at once that 80% of the unbalance signal developed by slidewire 54 of network 53 is applied by way of conductors 97 and 98 to a detector 164 and to a network 165 having slidewires 166 and 167 with their associated contacts 166a and 167a in their respective mid-positions. Accordingly, for a given change in area requirement the unbalance signal applied to detector 164 is much larger than the one which was applied to detector 64, and the end result is that the operation of motor 169 by closure of switch 168 for the motor and its field winding 169a is maintained until the governor 170 has been adjusted a correspondingly greater amount with corresponding greater change in the setting of valve 124a for the waterwheel 25 than for valve 24a for turbine 24.

After the greater adjustment of valve 124a has taken place, slidewire contact 167a will have been moved to a network-balancing position relative to slidewire 167. Thus, the generation of unit 17 will be increased to a substantially greater degree by proportional action than is unit 16. The increased generation by unit 17 through the action of wattmeters 89 adjusts contact 86a of slidewire 86 in the computing network 81 and simultaneously adjusts contacts 175a of slidewire 175 in the subsidiary reset network associated with the reset slidewire 59.

Keeping in mind that the proportional action occurs rapidly, it will be understood that contact 175a is moved to a new position relative to slidewire 175 and by an amount which is disproportionately large as compared with the 30% position of contact 59a. The result electrically is that the network including the detector 177 is unbalanced in a direction opposite to that which may be attributed to the potential introduced into that network by reset participation slidewire 59. Thus, detector 177 responds to the unbalance to rotate switch actuator 178 in a direction to close switch contact 178b, the switch contact through which impulses are to flow to energize motor 195 to decrease the generation of unit 17. The closure of a circuit through contact 178b is ineffective in that the area-requirement signal has moved contact 50 in a direction to produce impulses by way of conductor 94 and switch contact 178a for raising generation. A simple way of saying the foregoing is that when the proportional action is great as compared with the reset action, the latter is blocked. By blocking the reset action on unit 17 by permitting the large amount of proportional action as determined by setter 54, the effect on the generator of the combined control actions need not be considered. It is known in advance that with the large proportional action present, there will not be added to it any reset action and, hence, the proportional action may be made as large as experience indicates it should be for the particular unit in question.

This is another prime advantage of this invention as it is thereby possible to use the entire regulating capability of each unit for fringe loads.

As units 16 and 17 increase the area generation to meet the area requirement, the area requirement signal decreases and so do the fractional parts of the proportional action signal as derived from the proportional participation setters 54 and 56. As the unit 16 assumes its 70% share of the steady-state or sustaining load as determined by reset participation setter 61, the remaining 30% is assumed by the unit 17. Accordingly, as unit 16 takes its larger share of the sustaining load, the generation of unit 17 is decreased, and contact 175a of the generation slidewire 175 of the reset subsidiary network is moved toward its mid-position. When it is returned to a point where the unbalance signal as applied to detector 177 reverses in polarity, the switch-cam 178 opens the circuit through contact 178b and closes the motor circuit through contact 178a. Accordingly, reset impulses from device 49 then flow by way of conductor 94, switch contact 178a and by a field winding of motor 195 to adjust contact 166a of network 165 in a direction for operation by detector 164 of switch 168 for rotation of motor 169 to open valve 124a.

For the purpose of clarifying this feature, assume an area requirement requiring a sustained increase in generation of 15 megawatts. The sustained partipication for unit 16 would then be 10.5 megawatts, and the sustained participation for unit 17 would be 4.5 megawatts for the 70% and 30% participation settings mentioned above. Also, assume that the desired amount of proportional action associated with this load change should cause an increase in generation of 2 megawatts on unit 16 and 8 megawatts on unit 17 for the assumed 20% and 80% fringe participation settings. These values of proportional action would be determined by the circuit constants of network 53, but because the effect of proportional action is reduced to zero when the area requirement is reduced to zero, it is clear that the total generation change due to proportional action can never be as great as the generation required to reduce the area requirement to zero. More particularly, as this change in generation due to proportional action reduces the area requirement, slidewire 46a is returned toward its mid-position, but cannot be returned to it. Simultaneously, by reason of network 81, slidewire contact 92a is moved away from its mid-position by an amount and direction just sufficient to neutralize the movement of slidewire 46a. Thus, the fraction of the total signal in network 53 taken by slidewires 61 and 59 will remain unchanged. However, as previously described, the generation change due to proportional action will also appear in the networks associated with slidewires 61 and 59 by reason of adjustments of slidewires 175a and 75a. Thus, the fringe participation of 2-megawatts generation on unit 16 will be less than its required sustained participation of 10.5 megawatts, and "raise" impulses will be permitted to go to motor 195. However, the fringe participation of 8-megawatts generation on unit 17 will be greater than its required sustained participation of 4.5 megawatts. Hence, "raise" impulses to unit 17 will be blocked. As unit 16 increases its generation due to sustained action the area requirement slidewire contact 45a will be returned toward its mid-position, thus reducing the effect of proportional action on both units. When the fringe action on unit 17 is reduced below 4.5 megawatts, the position of cam 178 will be reversed or moved to a position to permit "raise" impulses to go to unit 16.

The reset action continues in a direction to meet the area requirement, the reset actions of both units eventually meeting the area requirement. At that time, the proportional action will have been reduced to zero.

The present system is well suited to meet the requirements of widely fluctuating fringe loads as exemplified by the rolling mill 22. For example, the proportional participation setters 54—56 may be moved to the positions producing changes in generation at their respective units and within the full capabilities of those units. Thus, the full potential of the generating capacity of the area can be developed in meeting widely fluctuating loads, which about a mean value vary from a minimum or low value to a high or maximum value. In meeting the widely fluctuating fringe loads which may appear and disapear in a matter of seconds, the reset actions may not come into play to cause a change in generation. Nevertheless, the sustaining load setters are separately and independently adjustable to predetermine their respective shares of the sustaining load changes which occur with variation in the mean load.

As developed in greater detail in Technical Paper No. 53-147 of the American Institute of Electrical Engineers, prepared by Clark Nichols, a co-inventor hereof, were the area requirement to be met only by reset action and without the individually and independently adjustable proportional actions introduced, a need to meet rapidly fluctuating loads by increased reset action would not accomplish its intended purpose, but would tend to introduce greater instability. This fact arises because reset action lags 90° behind changes in area requirement. Thus, as a fluctuating load reaches its maximum, the change in generation due to reset action is well below its maximum and is near its mean value. Maximum generation is not attained until after the fluctuating load has decreased to near its mean value. Instability will be accentuated by increased reset action. However, by introducing various degrees of proportional action for the respective units, together with predetermined degrees of reset action for the same units, approximately in-phase changes of generation are produced to meet the fluctuating load with the maximum generation attained at approximately the same time as the maximum value of the fluctuating load.

Where there is undesirable offset between change of generation with respect to the change in the fluctuating load on the area, it may sometimes be desirable to introduce an antipicatory control action, such as derivative or rate action. Such additional time-function control separately and independently adjustable for each of the units is readily provided merely by the opening of switches 100 and 101. The result is the inclusion, respectively in series with detectors 64 and 164, of potential differences derived from rate participation setters in the form of slidewires 102 and 103, a third slidewire 104 being provided for the generating unit not appearing in Fig. 1. The participation setters 102-104 are included in series-circuit relation with a tachometer-generator 105 having a field winding 105a energized as from the same alternating-current source as supplies network 65. The tachometer-generator 105 is driven through a mechanical connection by the detector 39 and thus applies a potential difference to slidewires 102–104 which varies with the rate of change of the area requirement signal. As the rate of change of that signal increases or decreases, so does the speed and direction of rotation of generator 105. The effect of the introduction of the potential difference introduced from slidewire 102 and its associated contact 102a into the network including detector 64 is to compensate for any lags present in the system which give rise to the offset previously referred to. Stated differently, the effect of the rate or derivative action is to advance the adjustment of governor 70 and of valve 24a in avoidance of offset due to governor inertia or other delay inherent in the control of unit 16. The needed rate action may be greater for unit 17 than for unit 16, and thus contact 103a may be set for a greater proportion of the rate action to be introduced into the network including detector 164 of unit 17 than for unit 16.

In the explanation of the operation of the system of Fig. 1, only a single assumption of a change in area requirement was made. In practice, it will be understood that area requirements may be relatively complex, involving continual change of the magnitudes of the fringe and sustaining loads. For example, it is well known that area requirements over a 24-hour period will exhibit definite trends which may be most economically met by periodically revising the nature of the control of the generating units. In accordance with the present invention, the reset participation and base setters may be adjusted automatically to follow scheduled-loading, or periodically by the load dispatcher, in order not only to meet the load changes, but also to maintain the most economic operation of the several units within the area. The reset participation and base setters can be adjusted at will without themselves introducing control action or change in generation. Similarly, each of the fringe load participation setters may be adjusted, and such adjustment will not change generation of its associated unit if the area requirement is then being met, and if not then being met, the change in generation due solely to a change in their settings will be relatively small if the area requirement is close to zero which will be the usual condition.

Now that the principles of the invention have been explained in connection with one typical example, it will be understood that they may be applied to many control problems of widely different character. Further to illustrate other applications of the invention, there will now be presented in the wiring diagram comprising Figs. 3A and 3B the application of the invention to a distribution system more nearly analogous to those encountered in practice. Instead of area A comprising a single station and being connected by a single tieline to another area, it is more likely to have connections to a plurality of adjacent areas to which there extend tielines 311—314. Power interchange through each tieline is measured by the respective wattmeters 215—218 which, through suitable telemetering channels 219—222 respectively including transmitters and receivers, serve to operate at the dispatcher's office suitable equipment shown as recorders 223—226, the respective values representing power flows being summed together by a suitable computing device 227 for operation of a net interchange instrument 228 shown in the form of a recorder or instrument of the type disclosed in said Williams patents and haivng an adjustable pen-index 228a. The response of the net interchange instrument 228 at the load dispatcher's level corresponds with the response of wattmeter 30 of Fig. 1, and as indicated by the mechanical connection 228b adjusts contact 331a relative to its slidewire 331 included in a control-signal initiating-network identical with that associated with the wattmeter 30 of Fig. 1. Parts having similar functions in general have been given reference characters having the last two digits the same as those in Fig. 1.

The detector 339 of the initiating network operates an area requirement recorder 256 and also relatively adjusts slidewire contact 345a relative to slidewire 345 included in a fringe or proportional network 353 including slidewires 354 and 356, there being one for each of the stations under control of the load dispatcher. Only two have been shown for the purposes of simplicity. Similarly, detector 339 relatively adjusts contact 346a relative to slidewire 346 for the network 358 including the sustaining or reset slidewires 359 and 361, there again being one of them for each of the stations under control of the dispatcher. Detector 339 also actuates contact 350 of impulse-producing device 349.

In manner quite analogous to the operation of Fig. 1, the load dispatcher may predetermine the operation of several stations which may form a part of area A and with respect to the proportional action and the reset action applicable to the particular stations. The respective proportional and reset adjustments are independent of each other and will be determined to meet both the load requirements and the most economical operation from the overall area viewpoint. More particularly, the proportional action as determined by the setting of slidewire contact 356a will through the action of detector 364 be applied to a telemetering transmitter 231, thence to a telemetering receiver 401 for adjustment at station No. 1 of slidewire contact 445a of slidewire 445.

Similarly, the reset action for station No. 1 as determined by the setting of slidewire contact 361a in network 358 will be applied by means of detector 377 to telemetering transmitter 233 to telemetering receiver 403 for adjustment of slidewire contact 446a of slidewire 446 in a reset network 458. The total generation of station No. 1 as measured by wattmeter 501 is utilized to actuate a telemetering transmitter 404 and through receiver 234 to adjust slidewire contact 375a of slidewire 375.

As shown, the "raise" and "lower" impulses originate at the load dispatcher's location and by the device 349 and through a suitable telemetering transmitter 232 and receiver 402 actuate switch contacts 512 and 513 which, through a local source of supply as indicated by supply lines 514 and 515, produce like "raise" and "lower" impulses at the station level.

The control actions at the station level resulting from the signals received by the receivers 401, 402 and 403 will be of the same kind and character as described in connection with Fig. 1. Accordingly, it will not be necessary to repeat the explanation of operation at the station level. It will be enough to say that the "raise" and "lower" impulses in Figs. 3A and 3B are originated by detector 339 at the dispatcher's level, these "raise" and "lower" impulses being reproduced at the station level by operation of switch contacts 512 and 513, such pulses thereafter being under the control of a detector and balanceable network for each unit in the station. The conductors with the arrows pointing "to No. 2" symbolically illustrate the duplication of equipment by the other unit in station No. 1. More particularly, contacts 512a and 513a controlled by cam 473 and detector 477 apply "raise" or "lower" pulses to motor 495 for adjustment of contact 466a to produce reset control adjustment of the governor 70 of unit 16. The proportional action as determined by the setting of slidewire contact 456a of proportional network 453 operates through detector 464 and the single-pole, double-throw switch 468 to control the direction of rotation of motor 469 to produce the proportional action adjustment of governor 70. It will be understood that similar networks associated with slidewire 454 of network 453 and with slidewire 459 of network 458 cooperate with similar circuit elements for the adjustment of the other generating units of station No. 1. Similarly, other equipment illustrated in Fig. 3B will be repeated in each of the other stations comprising a part of area A and will be under the control of the dispatcher and the apparatus illustrated in Fig. 3A which he utilizes for the intended purposes.

There remains to be considered at the load dispatcher's level, Fig. 3A, the adjustment of the base setter contact 374a of slidewire 374, which in this case determines the base load to be carried by station No. 1. It will be understood that for each station there will be similar circuit components and similar operation. For the sustained or reset control action on an area basis, provision must be made for the adjustment of slidewire contact 392a of slidewire 392 in response to area generation. A computing network 381 is, accordingly, provided including station base setters 384 and 386 and station generation slidewires 380 and 383. The contact 380a is adjusted by the telemetering receiver 234 and in accordance with the total generation from station No. 1. Accordingly, detector 390, responding to the algebraic sum of the generation from the several stations, adjusts contact 392a for purposes already explained in connection with the operation of Fig. 1 and in accomplishment of the sustained load change as between the several stations.

If the use of other time-function control actions appears desirable at the load dispatcher's level, they may be included in the same manner as the rate participation network described in connection with Fig. 1.

At the load dispatcher's level and with reference to the operations to be effected at the several stations, the advantages pointed out in connection with Fig. 1 are realized. Specifically, there is separate and independent adjustment of the relative proportions of generation changes on a station basis, as between the fringe load setters 354 and 356 and the sustaining load setters 359 and 381, as well as the blocking action of the reset action for a station when the fringe load or proportional control action for that station exceeds the reset action assigned to that station. In general, the economy of operation, though realized with control of the generating units at the station level, is more important in terms of annual savings when applied at the load dispatcher's, or high, level where overall economic operation of the interconnected stations is achieved. At the higher level, i. e., the super-load dispatcher, the several areas will be controlled as such, and in the same manner as has been described for the several stations of area A, in part illustrated in Figs. 3A and 3B.

While it is possible to utilize telemetering channels to bring to one dispatcher's office the fringe and sustained participation setters for all of the generating units in the one or more areas under his control, it is more likely the best arrangement will reside in the provision of a system like that shown in Fig. 3A in which one load dispatcher will adjust the fringe and sustained participation setters as between the several areas under his control for the most economic production of power to meet the loads of the total area under his control. Within each area there would then be a load dispatcher who would then adjust the scheduled loading amongst the several stations and units thereof most economically to meet his portion of the total area requirement. Thus, in accordance with the invention not only is great flexibility provided at a single-station level but by utilizing the invention at each level, the advantages are in each case realized.

While the modification of Figs. 3A and 3B may be preferred in the control of a plurality of stations from a load dispatcher's office, or from a super-load dispatcher's office, a great many advantages of the invention may be attained with considerable simplification and with substantial reduction in the number of telemetering channels required as, for example, between the load dispatcher's office and the several stations. Where the stations are widely separated geographically, telemetering channels represent a substantial item of expense. Accordingly, if fewer channels may be utilized, the savings in some cases may be quite large.

In Fig. 4 there has been disclosed a modification of the invention using but two telemetering channels 261 and 262 between the load dispatcher's office indicated by the arrows labeled LDO and a station of an area indicated by the arrows labeled "Station No. 1." The corresponding parts in Fig. 4 have the same reference characters as those in Figs. 3A and 3B. The area requirement signal is obtained as previously described and through detector 339 relatively adjusts contacts 345a and 346a with respect to their slidewires 345 and 346. A selected fractional part of the fringe or proportional control signal is taken from slidewire 356 by its contact 356a and applied to the subsidiary network 600, including slidewires 601 and 602. A detector 603 responds to any unbalance of said subsidiary network 600 and to the fringe or proportional signal introduced from slidewire 356. Detector 603 in response to such a signal adjusts slidewire contact 602a to rebalance the detector circuit and at the same time positions a contact 604a relative to a slidewire 604 to apply to telemetering transmitter 605 control signals varying in magnitude and in sense with the direction and extent of change of position of contact 604a relative to slidewire 604. These signals are received by telemetering receiver 606. They are applied to a detector 607 which actuates a contact 608a of a slidewire 608 in correspondence with the movement of contact 604a of slidewire 604. Slidewire 608 is included in a network 609 including a slidewire 610. A detector 611 responds to unbalance of network 609 and actuates a motor control switch 468 for energization of motor 469 through one or the other of its motor windings.

As described in connection with Figs. 1, 3A and 3B, the motor adjusts the setting of the governor 70 to change the generation of unit 16 in direction and by amount dependent upon the control signals transmitted by way of the telemetering channel 261. The generation of unit 16 actuates wattmeter 87 which positions contact 610a of slidewire 610 to rebalance network 609. There has thus far been described only the control action resulting from the separately and independently adjustable proportional slidewire 356.

In accordance with the invention, the signals transmitted through the telemetering channels 261 are varied in accordance with the sustained or reset controlling action which results from the adjustment of contact 346a relative to slidewire 346 to reset network 358. Such adjustment introduces unbalance into that network, and a selected and independently adjustable fraction of it is applied as by slidewire 361 and its contact 361a to a subsidiary network including a base-setting slidewire 620 and a rebalancing slidewire 621, operated by detector 603. The unbalance signal from the subsidiary network is detected by detector 377 and actuates the switch actuator 378 to control the application to the motor 395 of the impulses developed by the device 349. The motor 395 positions contact 601a of slidewire 601 and thus unbalances the subsidiary network 600 by an amount representative of the desired reset or sustaining control action. Such signal, of course, in part depends upon the operation of other components including the wattmeter 501 which responds to the total generation of station No. 1. Only one unit has been shown at that station. The presence of the other units is indicated as by the wattmeters 88 and 89. The telemetering receiver 675, in response to the total generation as applied to telemetering transmitter 676, actuates contact 380a of slidewire 380 in a computing network 381 which includes other slidewires, such for example, as slidewire 491 whose adjustable contact is moved in response to the total generation of the stations of the area.

The computing network 381 also includes the base-point setter 480 for station No. 1 and the base-point setter 483 for station No. 2. Contact 480a of slidewire 480 is mechanically connected for simultaneous adjustment as by a knob with contact 620a of slidewire 620 in the subsidiary network associated with the fraction-selecting slidewire 361 of reset network 358. The unbalance from the computing network 381 through a detector 490 adjusts contact 392a of slidewire 392 for the purposes already fully explained in connection with Figs. 1, 3A and 3B.

To simplify the presentation as much as possible, there have been omitted more complex arrangements which may be utilized to receive the signals from the telemetering receiver 606. Thus, for example, there may be to a substantial degree separation between the proportional and reset actions whereas in Fig. 4 they have been combined in their operation of detector 607. The simplified arrangement retains adequate advantages to justify its use and at the load dispatcher level the system of Fig. 4 retains all the advantages of the earlier described systems, including the blocking of the reset action by reason of adjustment of slidewire contact 621a by detector 603 by an amount representing a proportional component exceeding the reset component.

It will be understood that the repeated reference to the subdivision of the control signal into fractional parts has implied that such parts may be adjustable from zero to unity, selection by one of said participation setters for a unity fractional value corresponding with 100% of the control signal. It will be further understood that while in Fig. 1, one form of time-function control has been shown as derived from the device 49 in association with the participation setters 59—61, nevertheless the sustaining control action as applied to the signal-combining network 65 may be independently developed from the subsidiary networks associated with such slidewires. Thus, in the several modifications illustrated and in the one here suggested, the circuit 65 does provide a means for combining a selected fractional part from each of the networks for controlling the action of a single condition-controlling means, such as the valve 24a, in accordance with two control components, one of which may be the proportional action component, and the other of which may be the reset control action component, the effectiveness of which is determined by the selected fractional part taken from the network 58.

Having now described several modifications of the invention, it will be understood that certain features may be used without other features and that the invention is not limited to the particular apparatus disclosed but that the methods may be practiced by other apparatus, and further modifications may be made within the scope of the appended claims.

What is claimed is:

1. A system for maintaining a condition at a predetermined value comprising means operable in response to deviation of said condition from said value for producing a control signal of magnitude and sense related to the direction and extent of the deviation from said value, a first control circuit including separately and independently adjustable circuit components for developing from said control signal proportional action signals simultaneously varying with the extent and direction of said deviation and whose magnitudes respectively depend upon the setting of its associated one of said circuit components, additional control means including separately and independently adjustable circuit components for developing from said control signal a plurality of additional control signals simultaneously varying with the extent and direction of said deviation, means associated with and at least in part responsive to the magnitude of each of said additional signals for developing time-function control signals determined by a time-function of the deviation of said condition from said value, and condition-changing means each of which is operable in accordance with one of said proportional and one of said time-function control signals to maintain said condition at said predetermined value.

2. A system for maintaining a condition at a predetermined value comprising means operable in response to deviation of said condition from said value for producing a control signal of magnitude and sense related to the direction and extent of the deviation from said value, a first signal-dividing participation control circuit including separately and independently adjustable circuit components for developing from said control signal proportional action signals simultaneously varying with the extent and direction of said deviation and whose magnitudes respectively depend upon the setting of said circuit components, an additional signal-dividing participation control circuit including separately and independently adjustable circuit components for developing from said control signal a plurality of additional control signals simultaneously varying with the extent and direction of said deviation, means associated with and at least in part responsive to the magnitude of each of said additional signals for developing time-function control signals determined by a time-function of the deviation of said condition from said value, and a plurality of final control elements respectively operable in accordance with one of said proportional and one of said time-function control signals to maintain said condition at said predetermined value.

3. A control system for a power distribution system including a plurality of generating sources, comprising means operable in response to deviation of a system condition from a predetermined value for producing a control signal of magnitude and sense related to the direction and extent of the deviation from said value, a first signal-dividing participation control circuit including separately and independently adjustable circuit components for developing from said control signal proportional action signals simultaneously varying with the extent and direction of said deviation and each of whose magnitudes respectively depend upon the setting of its associated one of said circuit components, an additional signal-dividing participation control circuit including separately and independently adjustable circuit components for developing from said control signal a plurality of additional control signals simultaneously varying with the extent and direction of said deviation, means associated with and at least in part responsive to the magnitude of each of said additional signals for developing time-function control signals determined by an integral time function of the deviation of said condition from said value, and a final control element for each of said generating sources operable in accordance with one of said proportional control signals to change generation of one of said sources to meet at least a part of a changed generation requirement imposed by a fluctuating load and operable in accordance with one of said time-function control signals to change generation of said one source to meet at least a part of a sustained load change on said system.

4. A control system for a power distribution network including a plurality of generating sources for supplying power to said network, comprising means operable in response to change in load on said network for producing a deviation signal of magnitude and sense related to the direction and extent of said deviation, at least two signal-dividing participation control circuits, each including separately and independently adjustable circuit components, respectively responsive to said deviation signal, each of said circuit components developing a control signal simultaneously varying with the extent and direction of said deviation and of magnitude determined by the setting of its circuit component, means associated with and at least in part responsive to the magnitude of each of said control signals of one control circuit for developing time-function control signals determined by a time-function of said deviation, generation-changing means for each of said sources, means associated with each of said generation-controlling means operable in accordance with one of said time-function control signals to change generation of an associated source to meet at least part of a sustained load change on said system and operable in accordance with a control signal from said other control circuit to meet at least a part of a changed generation requirement imposed by a fluctuating load.

5. A system for controlling the generation of a plurality of generating sources operating under a schedule and connected to a common power distribution network, comprising means operable in response to deviation of said system from said schedule for producing a deviation signal of magnitude and sense related to the direction and extent of the deviation from said schedule, at least two signal-dividing participation control circuits each including separately and independently adjustable circuit components for respectively developing from said deviation signal control signals of relative magnitudes depending upon the relative settings of said circuit components in each of said circuits and simultaneously varying in accordance with the extent and direction of change of said deviation signal, generation-controlling means for each of said sources, means operable respectively in accordance with said control signals from a first of said circuits for respectively and proportionally changing the generation of each of said sources by amounts proportional to the respective magnitudes of said control signals, and means operable respectively in accordance with the control signals of a second of said circuits for respectively changing the generation of said sources in accordance with a time-function of said deviation and to extents corresponding with the magnitudes of said control signals of said second of said circuits.

6. The combination set forth in claim 5 in which said means operable to change said generation in accordance with a time function of said deviation includes a balanceable network including a circuit component for unbalancing said network upon a generation change of one of said sources due to said proportional action, and means included in said network for introducing therein an effect varying as a function of the total generation of said sources.

7. The combination set forth in claim 6 in which there is provided means operable in accordance with said deviation for producing "raise" signals with departure of said generation from said schedule in one direction and for producing "lower" signals with departure of said generation from said schedule in the opposite direction, said means for producing said change of generation in accordance with the time function including a circuit controller for applying said "raise" or said "lower" signals to change said generation to establish a changed level of generation in conformity with said schedule.

8. The combination set forth in claim 6 in which said last-named network includes a detector, a circuit-controller operable by said detector upon occurrence of unbalance in said network, means operable in response to said deviation for producing "raise" signals of length dependent upon the extent of said deviation in one direction, and for producing "lower" signals of length dependent upon the extent of said deviation in the opposite direction from said schedule, and means associated with said circuit-controller for applying said impulses to change the generation of one of said sources to establish a new level of generation in accordance with said schedule.

9. A system for controlling the generation of a plurality of generating sources operating under a schedule and connected to a common power distribution network, comprising means operable in response to deviation of said system from said schedule for producing a deviation signal of magnitude and sense related to the direction and extent of the deviation from said schedule, at least two signal-dividing participation control circuits each including separately and independently adjustable circuit components for respectively developing from said deviation-signal control signals of relative magnitudes depending upon the relative settings of said circuit components in each of said circuits and simultaneously varying in accordance with the extent and direction of change of said deviation signal, generation-controlling means for each of said sources, means operable respectively in accordance with said control signals from a first of said circuits for respectively and proportionally changing the generation of each of said sources by amounts proportional to the respective magnitudes of said control signals, balanceable subsidiary networks corresponding in number with and including respectively in them one of said circuit components of a second of said circuits, each of said subsidiary networks including a base-point setter, a rebalancing circuit component, and a detector of unbalance for operating said rebalancing component, means operable in accordance with unbalance of each subsidiary network for varying the generation in accordance with a time integral of said deviation to establish a new level of generation to meet a sustained change of load.

10. A system for controlling the generation of a plurality of generating sources operating under a schedule and connected to a common power distribution network, comprising means operable in response to deviation of said system from said schedule for producing a deviation signal of magnitude and sense related to the direction and extent of the deviation from said schedule, at least two signal-dividing participation control circuits, each including separately and independently adjustable circuit components for respectively developing from said deviation signal control signals of relative magnitudes depending upon the relative settings of said circuit components in each of said circuits and simultaneously varying in accordance with the extent and direction of change of said deviation signal, generation-controlling means for each of said sources, means operable respectively in accordance with said control signals from a first of said circuits for respectively and proportionally changing the generation of each of said sources by amounts proportional to the respective magnitudes of said control signals, balanceable subsidiary networks corresponding in number with and including respectively in them one of said circuit components of a second of said circuits, each of said subsidiary networks including a base-point setter, a generation-adjustable circuit component, a rebalancing circuit component, and a detector of unbalance for operating said rebalancing component, means operable in accordance with unbalance of each subsidiary network for varying the generation in accordance with a time-integral of said deviation to establish a new level of generation to meet a sustained change of load, means responsive to the change of generation of each of said sources for respectively introducing a compensating signal in its associated subsidiary network, and means for preventing change in said generation in accordance with said time-integral of deviation whenever the change in generation due to a control signal from a circuit component of a first of said circuits produces a proportional change of generation greater than that called for by said subsidiary network to meet said sustained load change.

11. A system for controlling the generation of a generating source operating under a schedule and connected to a power distribution network, comprising means operable in response to deviation of said system from said schedule for producing a deviation signal of magnitude and sense related to the direction and extent of the deviation from said schedule, at least two signal-dividing participation control circuits each including separately and independently adjustable circuit components for respectively developing from said deviation signal control signals of relative magnitudes depending upon the relative settings of said circuit components in each of said circuits and simultaneously varying in accordance with the extent and direction of change of said deviation signal, generation-controlling means for said source, means operable respectively in accordance with one of said control signals from a first of said circuits for actuating said controlling means proportionally to change the generation of said source by an amount related to the magnitude of said control signal, a balanceable subsidiary network associated with an adjustable circuit component of a second of said circuits including a circuit component adjustable in accordance with generation of said source and including another circuit component adjustable to establish a scheduled generation for said source, and means including a detector for varying the generation of said source in accordance with a time-integral of said deviation when said proportional change of generation is less than that called for by said subsidiary network and for preventing change of generation in accordance with said time-integral of said deviation whenever said generation due to said proportional adjustment exceeds that called for by said subsidiary network.

12. A system for controlling the generation of a plurality of generating sources operating under a schedule and connected to a common power distribution network, comprising means operable in response to deviation of said system from said schedule for producing a deviation signal of magnitude and sense related to the direction and extent of the deviation from said schedule, at least two signal-dividing participation control circuits each including separately and independently adjustable circuit components for respectively developing from said deviation signal control signals of relative magnitudes depending upon the relative settings of said circuit components in each of said circuits and simultaneously varying in accordance with the extent and direction of change of said deviation signal, generation-controlling means for each of said sources, means operable respectively in accordance with said control signals from a first of said circuits for respectively and proportionally changing the generation of each of said sources by amounts proportional to the respective magnitudes of said control signals, balanceable subsidiary networks corresponding in number with and including respectively in them one of said circuit components of a second of said circuits, each of said subsidiary networks including a base-point setter, a generation-adjustable circuit component, a rebalancing circuit component, and a detector of unbalance for operating said rebalancing component, a computing network including circuit components and a detector responsive to deviation of generation of all of said sources from the scheduled generation for said sources, and means operable by said detector and included in said second of said participation control circuits for maintaining upon each of said circuit components thereof the control signals established by said deviation of said system from said schedule.

13. In combination with a plurality of final control elements respectively adjustable in direction and extent to maintain a condition at a predetermined value, means operable in response to deviation of said condition from said value for producing a control signal of magnitude and sense related to the direction and extent of deviation of said condition from said value, a first control means including circuit components for subdividing said control signal into separately and independently adjustable fractional parts which simultaneously vary with the extent and direction of said deviation, means associated with each of said final control elements for adjusting it in accordance with corresponding fractional parts of said control signal, additional control means for subdividing said control signal into separately and independently adjustable fractional parts, and means operable under the control of said additional control means for modifying the adjustments of said final control elements to include a component varying with a time-function of said deviation of said condition.

14. A system for maintaining a condition at a predetermined value comprising means operable in response to deviation of said condition from said value for producing a control signal of magnitude and sense related to the direction and extent of the deviation of said condition from said value, a first control means including circuit components for subdividing said control signal into separately and independently adjustable fractional parts simultaneously varying with the extent and direction of said deviation, means for developing from each of said fractional parts of said control signal a proportional action signal, additional control means for subdividing said control signal into separately and independently adjustable fractional parts, means at least in part responsive to the magnitude respectively of one of said additional fractional parts for developing control signals whose magnitudes are determined by a time-function of the deviation of said condition from said value, and a condition-changing means for each said source operable in accordance with said proportional and said time-function control signals to maintain said condition at said predetermined value.

15. The combination set forth in claim 14 in which means are provided to prevent change in generation due to said time-function signals when said proportional action signal exceeds a predetermined value.

16. A system for controlling the output of a group of electrical generating sources having a common power distribution system comprising means operable in response to deviation of a system condition from a predetermined value for producing a control signal of magnitude and sense related to the direction and extent of deviation of said condition from said value, a first control means including circuit components for subdividing said control signal into fractional parts which simultaneously vary with the extent and direction of said deviation, means responsive to one of said fractional parts for proportionally adjusting the power generation of one of said sources in accordance with the magnitude of said fractional part, means varying in accordance with a time-function of said deviation, a second control means including circuit components indepently dividing said signal into fractional parts which simultaneously vary in extent and direction with said deviation, and means partly under the control of one of said last-named fractional parts for maintaining a changed level of generation of one of said sources related to the size of said fractional part.

17. The combination set forth in claim 16 in which time pulses of length related to the deviation of said condition are supplied to a device for moving a component of a balanceable network, said fractional part from said first control means also being applied to said network, and said network including a component operable with change of power generation for rebalancing the network.

18. The combination set forth in claim 17 in which each of the circuit components of said second control means is included in a balanceable network including a circuit component adjustable with change of power generation of one of said sources, a component preset for generation level of said source, and an adjustable component for rebalancing said network and for controlling the application of said time pulses to said device, said circuit components of said second control means producing said fractional parts being included in a network including a component adjustable with deviation of the condition and a component operable to unbalance the network in the same direction and to the same extent as the first element thereof as said condition is returned to its predetermined value.

19. A system for controlling the generation of a group of electrical generating sources having a common power distribution system comprising means operable in response to deviation of a system-condition from a predetermined value for producing a control signal of magnitude and sense related to the direction and extent of deviation of said condition from said value, a first control means operable in response to said control signal for subdividing it into parts and for respectively changing the output of each of said generating units by an amount related only to its corresponding part of the extent of said deviation, and a second control means operable in response to said control signal and independently dividing that signal into selected parts and for changing respectively the output of said generating units by amounts related to a time-function of said deviation and respectively during periods whose lengths are determined by the sizes of said parts of said second control signal.

20. In combination, a plurality of final control elements for maintaining a condition at a predetermined value, means for applying control signals to each of said final control elements and for independently adjusting them as to magnitude but maintaining them in predetermined relation to the extent of deviation of said condition from said predetermined value, means for applying to each of said final control elements an additional control action, each of said last-named means being independently adjustable relative to the other and each of which includes structure for producing said control action as a time-function of the deviation of said condition from said predetermined value and independent of the relative magnitudes of said first-named control signals.

21. The method of controlling a plurality of final control elements to maintain a condition at a predetermined value which comprises developing independently adjustable control signals of magnitude proportional to the deviation of said condition from said value, applying said proportional signals respectively to said final control elements for immediate adjustment thereof in accordance with their respective magnitudes, concurrently and respectively applying reset signals to said final control elements for establishing reset adjustment of each of them, and varying in accordance with actual generation, scheduled generation, and said deviation, the time-duration of change of generation by said reset signals.

22. The method of controlling the generation of a generation source operating under a schedule and connected to a distribution network which comprises proportionally changing the power generation of said source by amounts proportional to deviation of said sysem from said schedule, additionally changing the generation of said source in accordance with a time-function of said deviation only when the change in power generation due to said proportional adjustment is less than that to be made in accordance with said time-function of said deviation.

23. A system in which a plurality of condition-changing means are separately adjusted to maintain a controlled variable at a predetermined value, comprising means operable in response to deviation of a condition of said system from a predetermined value for producing a control signal of magnitude and sense related to the direction and extent of deviation of said controlled variable from said predetermined value, a first control network for dividing said control signal into first fractional parts independently adjustable from zero to unity, a second control network for dividing said signal into fractional parts, each of which is separately adjustable independently of said first fractional parts between values of zero and unity, and controlling means for each of said condition-changing means respectively responsive to a selected fractional part of said control signal of said first control network for operating each said condition-changing means by an amount proportional to change of said selected fractional part resulting from change in the magnitude of said controlled variable and for varying said operation of said condition-changing means in accordance with a time function of a selected fractional part of said control signal produced by said second control network.

24. A system in which a plurality of condition-changing means are separately adjusted to maintain a controlled variable at a predetermined value comprising means operable in response to deviation of a condition of said system from a predetermined value for producing a control signal of magnitude and sense related to the direction and extent of deviation of said controlled variable from said predetermined value, a first control network for dividing said control signal into first fractional parts independently adjustable from zero to unity, a second control network for dividing said signal into fractional parts, each of which is separately adjustable independently of said first fractional parts between values of zero and unity, controlling means for each of said condition-changing means and respectively responsive to a selected fractional part of said control signal of said first control network for operating said condition-changing means by an amount proportional to change of said selected fractional part resulting from change in the magnitude of said controlled variable, and means for varying respectively the action of each of said controlling means in the adjustment of said condition-changing means in accordance with a time-function of a selected fractional part of said control signal produced by said second control network.

25. A system in which a plurality of condition-changing means are separately adjusted to maintain a controlled variable at a predetermined value comprising means operable in response to deviation of a condition of said system from a predetermined value for producing a control signal of magnitude and sense related to the direction and extent of deviation of said controlled variable from said predetermined value, a first control network for dividing said control signal into first fractional parts independently adjustable from zero to unity, a second control network for dividing said signal into fractional parts, each of which is separately adjustable independently of said first fractional parts between values of zero and unity and each of which varies in accordance with a time function of said control signal, and means combining a selected fractional part of control signal from each of said control networks for controlling the action of one of said condition-changing means in accordance with the algebraic sum of said selected fractional parts.

26. A system in which a plurality of condition-changing means are separately adjusted to maintain a controlled variable at a predetermined value comprising means operable in response to deviation of said variable from said value for producing a control signal of magnitude and sense related to the direction and extent of deviation of said controlled variable from said predetermined value, a first control network for dividing said control signal into first fractional parts independently adjustable from zero to unity, a second control network for dividing said signal into fractional parts, each of which is separately adjustable independently of said first fractional parts between values of zero and unity and each of which varies as a time function of said control signal, and means combining a selected fractional part of control signal from each of said control networks for controlling the action of one of said condition-changing means in accordance with the algebraic sum of said selected fractional parts.

27. A system in which a plurality of condition-changing means are separately adjusted to maintain a controlled variable at a predetermined value comprising means operable in response to deviation of said variable from said value for producing a control signal of magnitude and sense related to the direction and extent of deviation of said controlled variable from said predetermined value, a first control network for dividing said control signal into first fractional parts independently adjustable from zero to unity, a second control network for dividing said signal into fractional parts, each of which is separately adjustable independently of said first fractional parts between values of zero and unity, and means combining a selected fractional part of control signal from each of said control networks for controlling the action of one of said condition-changing means in accordance with two control components, one of which is a proportional action component whose magnitude is established by the selected fractional part of control signal from one of said networks, and the other of which is a reset control action, the effectiveness of which is determined by the selected fractional part of control signal from the other of said networks.

28. The combination set forth in claim 27 in which means are provided to block one of said control components so long as the other of said control components is of greater magnitude and for rendering effective the lesser of said control components after the greater has been reduced to a value lower than the first component.

References Cited in the file of this patent

UNITED STATES PATENTS

| Number | Name | Date |
|---|---|---|
| 1,699,128 | Warren | Jan. 15, 1929 |
| 1,935,732 | Squibb | Nov. 21, 1933 |
| 1,984,187 | Hayward et al. | Dec. 11, 1934 |
| 2,010,594 | Kerr | Aug. 6, 1935 |
| 2,039,426 | Kerr | May 5, 1936 |
| 2,050,338 | Kerr | Aug. 11, 1936 |
| 2,054,411 | Doyle | Sept. 15, 1936 |
| 2,113,164 | Williams, Jr. | Apr. 5, 1938 |
| 2,124,725 | Williams, Jr., et al. | July 26, 1938 |
| 2,348,058 | Coates et al. | May 2, 1944 |
| 2,366,968 | Kaufmann | Jan. 9, 1945 |
| 2,367,746 | Williams, Jr. | Jan. 23, 1945 |
| 2,560,914 | Almeras | July 17, 1951 |
| 2,624,015 | Herwald et al. | Dec. 30, 1952 |
| 2,643,345 | Almstrom et al. | June 23, 1953 |

OTHER REFERENCES

Technical Paper No. 53-147 of the American Institute of Electrical Engineers, by Clark Nichols.